(12) United States Patent
Wolfson et al.

(10) Patent No.: US 11,461,084 B2
(45) Date of Patent: Oct. 4, 2022

(54) OPTIMIZING DOCKER IMAGE ENCRYPTION—KUBERNETES USING SHAMIR SECRETS TO ENFORCE MULTIPLE CONSTRAINTS IN CONTAINER RUNTIME ENVIRONMENT

(71) Applicant: EMC IP Holding Company LLC, Hopkinton, MA (US)

(72) Inventors: Kfir Wolfson, Beer Sheva (IL); Jehuda Shemer, Kfar Saba (IL); Stav Sapir, Beer Sheba (IL); Naor Radami, Shokeda (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/193,159

(22) Filed: Mar. 5, 2021

(65) Prior Publication Data
US 2022/0283794 A1 Sep. 8, 2022

(51) Int. Cl.
| | |
|---|---|
| H04L 29/06 | (2006.01) |
| G06F 8/61 | (2018.01) |
| G06F 9/455 | (2018.01) |
| H04L 9/08 | (2006.01) |

(52) U.S. Cl.
CPC ............ *G06F 8/61* (2013.01); *G06F 9/45558* (2013.01); *H04L 9/085* (2013.01); *H04L 9/0825* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,739,507 B2 * | 6/2010 | Eckleder | G06Q 20/3674 713/168 |
| 8,904,080 B2 * | 12/2014 | Martin | G06F 3/0664 714/E11.12 |
| 10,326,744 B1 | 6/2019 | Nossik et al. | |
| 2001/0002486 A1 * | 5/2001 | Kocher | G06Q 20/367 713/171 |
| 2008/0263363 A1 | 10/2008 | Jueneman et al. | |
| 2010/0058054 A1 * | 3/2010 | Irvine | H04L 63/08 726/28 |

(Continued)

OTHER PUBLICATIONS

European Search Report received for EP Patent Application No. 22157242.3, dated Jul. 26, 2022, 7 pages.

*Primary Examiner* — Maung T Lwin
(74) *Attorney, Agent, or Firm* — Workman Nydegger

(57) ABSTRACT

One example method includes using a primary key to encrypt a decryption key, splitting the primary key into 'n' parts, where at least 'k' parts of the 'n' parts are required to restore the primary key, and 'k'≤'n', storing some of the 'k' parts in respective locations in a production environment, and one of the stored 'k' parts is held by a verifier stage, receiving, at the verifier stage, a request for restoration of the primary key, where the request is received from a deployment pod and the request includes a subset of the 'k' parts and the encrypted decryption key, performing, by the verifier stage, a validation process concerning the deployment pod, and restoring, by the verifier stage, the primary key, wherein the primary key is restored using the 'k' part held by the verifier stage.

20 Claims, 7 Drawing Sheets

(56) References Cited

U.S. PATENT DOCUMENTS

| | | | |
|---|---|---|---|
| 2013/0246808 A1* | 9/2013 | Orsini | G06F 21/6218 |
| | | | 713/189 |
| 2019/0220852 A1* | 7/2019 | Black | G06Q 20/0855 |
| 2019/0245857 A1 | 8/2019 | Pe'er et al. | |
| 2021/0058247 A1 | 2/2021 | Bursell et al. | |

* cited by examiner

OPTIMIZING DOCKER IMAGE ENCRYPTION—KUBERNETES USING SHAMIR SECRETS TO ENFORCE MULTIPLE CONSTRAINTS IN CONTAINER RUNTIME ENVIRONMENT

FIELD OF THE INVENTION

Embodiments of the present invention generally relate to container image encryption and decryption. More particularly, at least some example embodiments of the invention relate to systems, hardware, software, computer-readable media, and methods for container decryption key handling.

BACKGROUND

In general, encrypted data requires the use of a matching decryption key to enable access to the data. Depending on the requirements of a particular product, there may be no limit to the various policies that may be defined and implemented for encryption of, for example, docker images using a particular encryption key. Example policies might include using a single encryption key for all images, using an encryption key per image, using an encryption key per container build, or using an encryption key corresponding to a particular period of time. Such policies may result in the creation of many encrypted images, with many decryption keys that need to be matched, so that the docker images can be run in a production environment.

Another concern relates to secret handling in environments such as Kubernetes, for example. In general, handling secrets in any environment can be a tedious task, and managing decryption keys required for running encrypted images in a secure manner is no different. As well, keeping all the encrypted images, and their respective decryption keys in one place, such as in a Kubernetes environment, can expose the images to various attack vectors.

Further, passing a secret, such as a decryption key for example, to a remote site upon deployment to production can be problematic. To take one example, passing a decryption key in a secure manner to a Kubernetes runtime environment, from a development environment that is not on the same premises, can be difficult. This may be particularly so if a policy is in place which required a different decryption key per image version. Further, the key might be intercepted in transit between the two environments, and/or the key may be vulnerable to other attack vector scenarios.

As a final example, it may be problematic to provide a decryption key to a valid docker image. In particular, the decryption key needs to be provided at some point upon deployment of the encrypted docker image so that a decryption process can take place. An unauthorized deployer might deploy a malicious docker image and request the decryption key from the Kubernetes secret management. Revealing the decryption key to an unauthorized entity might put the encrypted data at risk. Moreover, depending on the key policy that is in place, a whole set of applications may possibly be compromised.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
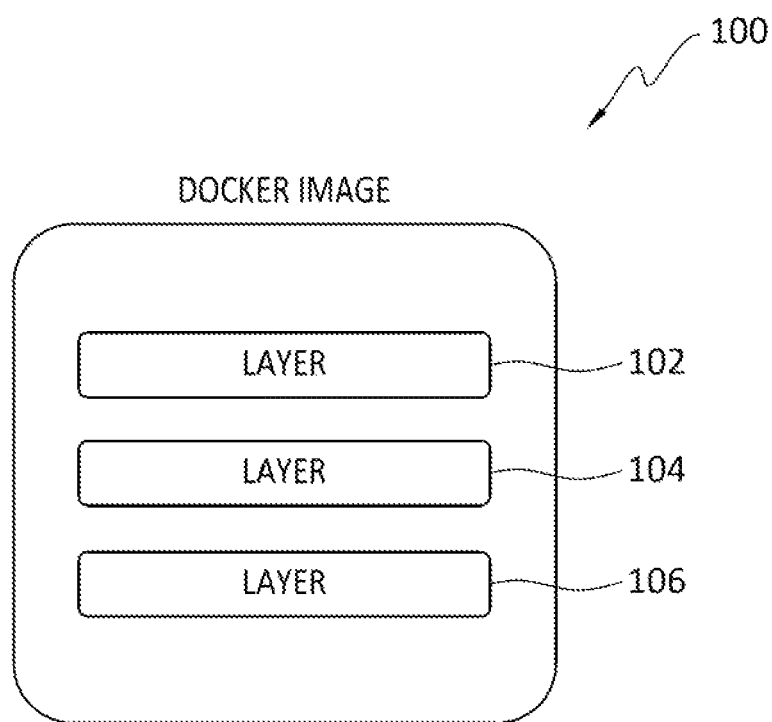
FIG. 1 discloses aspects of an example container.

Embodiments of the present invention generally relate to container image encryption and decryption. More particularly, at least some example embodiments of the invention relate to systems, hardware, software, computer-readable media, and methods for container decryption key handling.

In general, example embodiments of the invention may, but are not required, to be implemented in environments that may employ the use of a dual-container approach to handle sensitive data from a single docker image by extracting sensitive layers and encrypting them to other container that responsible for the decryption of the encrypted data and new container without the sensitive data. In such an approach, a user has control over which specific layers of the image are encrypted. As the sensitive data from the original image is separated and stored in other image, a dual container deployment may be employed.

Thus, some example embodiments are directed to approaches that may employ specific Kubernetes packaging and runtime methods to securely provide a decryption key for use in decrypting one or more encrypted layers of a container image used in a dual container deployment. The key itself may be distributed among various Kubernetes parts or entities using a secret sharing technique, such as Shamir secrets for example. At least some embodiments may improve the decryption key handling, storage and assignment to a pod by implementing an approach in which each step of a Kubernetes pod running flow exposes a respective part of the multi-part key. Only after all secure deployment parts have completed will the full decryption key be available and allow decryption and running of the pod. The end result may be a secure deployment process for a dual-container concept that holds and employs encrypted sensitive data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a decryption key is securely provided for use in deployment of a docker image. In an embodiment, security of a decryption key is enhanced by use of a secrets technique to split the decryption key into multiple parts. In an embodiment, the various parts of a decryption key may be provided by different respective entities, so that multiple steps may be required, and validated by other entities, before access can be gained to the decryption key.

It is noted that embodiments of the invention, whether claimed or not, cannot be performed, practically or otherwise, in the mind of a human. Consistent with the illustrative examples disclosed herein, embodiments of the invention are applicable to, and find practical usage in, computing environments in which, for examples, keys are encrypted and decrypted rapidly in response to requests received from containerized applications. As hundreds, thousands, or more, such applications may be operating in a production environment, management and implementation of key encryption and decryption, as well as the verification of the legitimacy of requests for keys, may be performed on an ongoing basis for each of those applications, and may have to be performed quickly in order not to slow or otherwise impair the deployment and operation of the applications. Such handling and processing is well beyond the mental capabilities of any human to perform practically, or otherwise. Thus, while other, simplistic, examples may be disclosed herein, those are only for the purpose of illustration and to simplify the discussion, but may not necessarily represent real world applications of embodiments of the invention. Accordingly, nothing herein should be construed as teaching or suggesting that any aspect of any embodiment of the invention could or would be performed, practically or otherwise, in the mind of a human.

A. Overview

As noted earlier, example embodiments of the invention may be employed in connection with images, such as Docker images for example, that may include multiple layers. In general, an image may comprise a combination of a file system and associated parameters, microservices, and microservice dependencies. Each of the microservices may perform one or more respective functions, and a microservice may be employed by multiple different applications. A particular instance of an image may be referred to as a container or container image. One or more containers, or container images, may be deployed in various environments, such as a cloud computing environment for example. Note that while reference may be made herein to Docker layers, images, and other Docker components (see www.docker.com), the scope of the invention is not limited to Docker components and, more generally, any other layers, images, components, and associated functionalities may alternatively be employed. Thus, reference herein to 'Docker' elements is only by way of example, and not limitation.

A.1 Docker Layers and Deployment

In general, a Docker image refers to a combination of files grouped into Layers that are defined in a Dockerfile. A Dockerfile describes the base image and the additional layers the image will be composed of. Each command in a Dockerfile may result in an additional respective layer. A command that does not modify the image file system may be considered as an empty layer, and the metadata of the commands may be kept in build history within the docker image configuration file. One example Docker image is denoted at 100 in FIG. 1, and comprises layers 102, 104, and 106. Each Docker image may have an image configuration file that describes various parameters of the image itself such as, for example, the layers the image is composed of, and what the entry point is, that is, the command that will run after instantiation of the image.

Technology such as a Docker engine may provide the ability to run containers on any host, regardless of the host OS. Each Docker image is a template of a light weight OS and can be added with application and data files. As noted, a Docker image is a file collection that can be run on a Docker engine or any platform that supports Docker images, such as the Kubernetes platform for example.

With continued reference to aspects of Docker images, a Docker image registry serves as a repository to store the layers that together form a Docker image. Such a registry stores the image configuration and layers as blobs in zipped fashion with plain text data inside. A registry may provide an API (Application Program Interface) to pull and push Docker images. There are native Docker registries, and other products like Artifactory, also provide Docker registry functionality. The Docker registry keeps manifests of all images in the registry. A manifest holds data about what configuration to use and the layers that construct the image. For example, Docker hub is a public domain docker registry that stores Docker images for public use. Many use cases and products rely on this registry to hold their production images which can be used for deployment in AWS, Azure, or any other suitable platform.

In terms of the use of a Docker image, Docker deployment is a process that instantiates a Docker image to obtain a running process on a Docker engine, and to run a containerized application. Deployments can be done on any host with Docker engine or any platform that supports and orchestrates Docker images. In some instances at least, the deployment environments make a copy of the Docker image from a registry and retain the image locally.

While Docker images and associated processes provide useful functionality, they may be vulnerable to threats. In particular, any data, including Docker images, that is stored in a DB, Artifactory or local files is exposed to a risk of data theft, especially in public domains that can be breached. Additionally, there is a risk in private environments as well. Data can be stolen when the data is in a production environment, or in some backup environments. Such problems may be resolved, in part or in whole, by encryption of the Docker image.

A.2 Docker Image Encryption

In a case where a Docker image contains sensitive data, an approach may be employed for building a secure Docker image that has only the sensitive data encrypted with a designated decryptor, and another image without the sensitive data but with all the original metadata and run commands. In general, this approach may involve marking which data of the Docker image should be encrypted.

Particularly, the Dockerfile of the image may be modified in order to mark the layers of the image that are to be encrypted.

Within the Docker file, and just above the commands defining the layers to be marked, the following command may be added:

RUN echo "=========START ENCRYPTION========"

This results in an empty layer that holds this command in the history of the layers within the Docker image configuration file. During the image encryption process, the image layers can be traversed until the special, marked, layer is located. It can then be seen, which layers should be protected, namely, the layers following the RUN echo command. In this way, layers to be encrypted may be clearly identified and, as well, this approach may enable optimization of a tradeoff between protection of image layers, and runtime constrains.

It is noted that the 'START ENCRYPTION' string is provided only by way of example, and any other suitable string may be employed. Further, while "RUN echo" results in an empty layer, other commands may be used, including commands that create a, non-empty, layer. In any case, the layer created may be referred to as a "Signal Layer," since it signals the point, in the image, at which encryption should begin. As noted, any pre-agreed upon layer can be used, but using a trivial empty layer may be relatively simple, and may impose no additional limitations.

Figure 2:
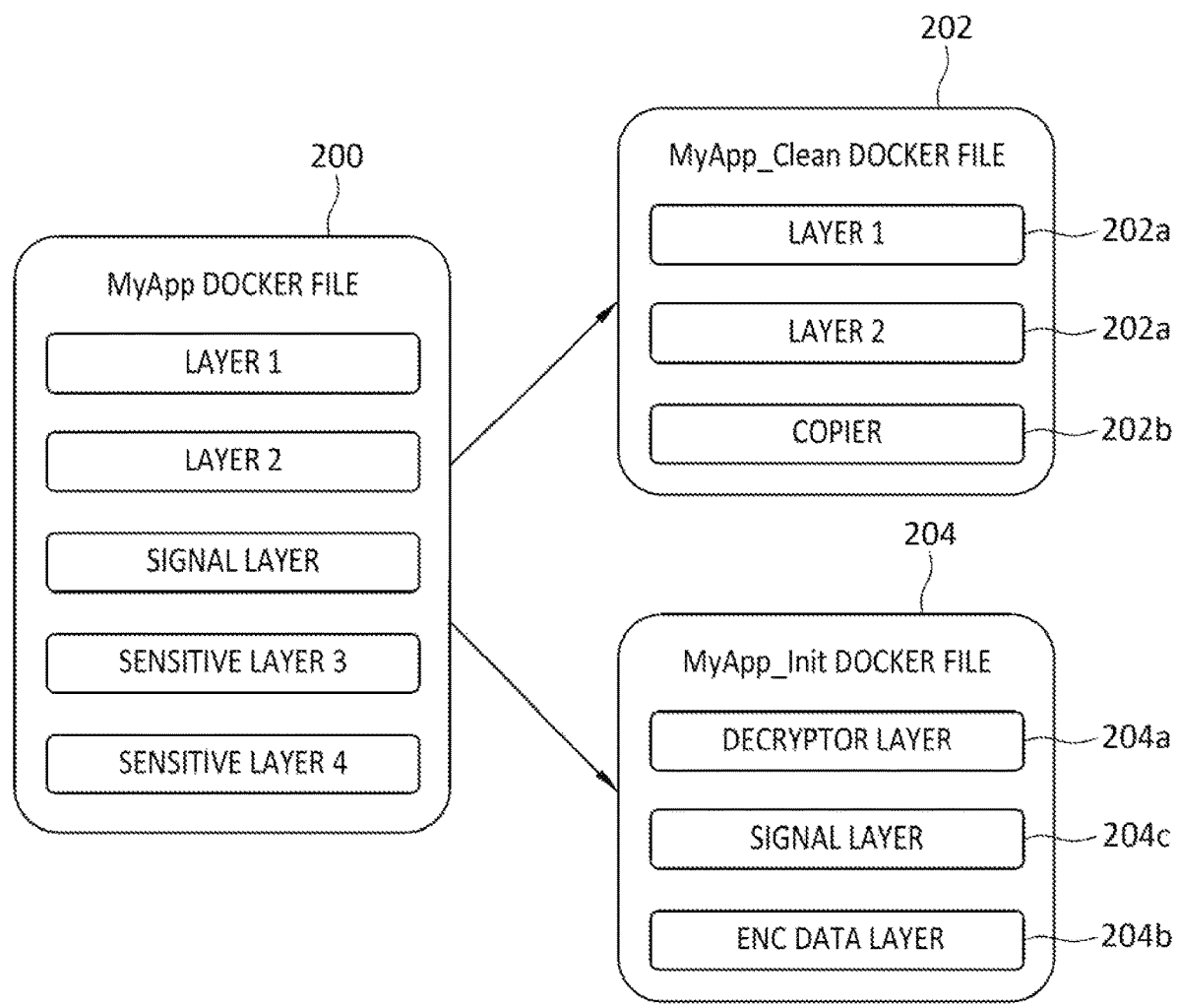
FIG. 2 discloses aspects of a container that has been split into two parts.

With reference next to FIG. 2, some details are provided concerning construction of Docker images that include sensitive data. In general, a decryptor may be packaged together with the encrypted version of the data in what is referred to herein as an 'Init' container.

In more detail, a Docker file 200 may be split into two Docker images, namely a Docker image, or container, 202 that includes non-sensitive data. In the example of FIG. 2, the Docker image 202 is designated 'MyApp_Clean' and holds the non-encrypted layers 202*a*, which may be applications, and a copier layer 202*b*, discussed in more detail elsewhere herein. A second Docker image, or container, 204, designated 'MyApp_Init,' is created that includes a decryption application, such as in the form of a decryptor layer, or simply decryptor, 204*a*, and encrypted sensitive data 204*b*. A signal layer 204*c* indicates where encryption should begin.

Each of the Docker images 202 and 204 may be built into a separate respective, container and one example pod specification may be created as follows:

apiVersion: v1
kind: Pod
metadata:
name: myapp-pod
labels:
app: myapp
spec:
containers:
name: myapp-container
image: myapp_clean:1.1
initContainers:
name: init-myapp
image: myapp_init:1.1

As can be seen, the example pod specification includes the two containers and the 'Init' container is explicitly defined as such in the pod specification. 'Myapp_init' will be guaranteed to run and complete before 'Myapp_clean' is run.

With continued reference to the example of FIG. 2, the decryptor 204*a* may run in a container, that is, Docker image 204, separate from the application, running the Docker image 202, which means that the decryptor is not dependent on the application OS. This approach may simplify the maintenance and testing of the decryptor of the decryptor layer 204*a*. Moreover, because 'Init' containers, such as the 'Myapp_init' container 204, can run with a different view of the filesystem or devices than the app containers, such as the 'MyApp_Clean' container 202, in the same pod, decryption keys may be provided to the 'Init' container but are not accessible to the application.

An example running sequence for the 'MyApp_Clean' container 202 and the 'Myapp_init' container 204 may proceed as set forth hereafter. In particular, one example running sequence may be as follows:

1. The 'Init' container 204 runs first. The decryptor 204*a* is initialized with the decryption keys passed to it by a configuration or filesystem.
2. Decryptor 204 uses the signal layer 204*c* to find the encrypted data layer 204*b* in the Init container 204, or may use a predefined location to locate the encrypted data layer 204*b*.
3. Decryptor 204 decrypts the encrypted data to a directory on the filesystem. For example, to: /myapp_decryted1 base directory. Each layer may have its own directory under this base directory.
4. If the decryption completes successfully, the main application is run
5. The application layers 202*a* and 202*b* are run normally one at a time until the copier layer 202*b* is reached.
6. Copier layer 202*b* is a simple Docker layer that does the following command: cp -r/myapp_decryted1/
   That is, the copier layer 202*b* may copy the unencrypted layers into their place in the layer root directory. Note that the foregoing is in the form of Linux syntax, but Windows has a similar command which may alternatively be used.
7. The application continues to run like a conventional Docker application The above sequence may make the decryption transparent to the application. The separation of decryptor 204*a* from the app 202*a/b* may make the scheme more modular and, at the same time, more secure, as it may reduce the application attack surface since the decryptor 204*a* is separated from the application layers 202*a/b*.

B. Aspects of Some Example Embodiments

Figure 3:
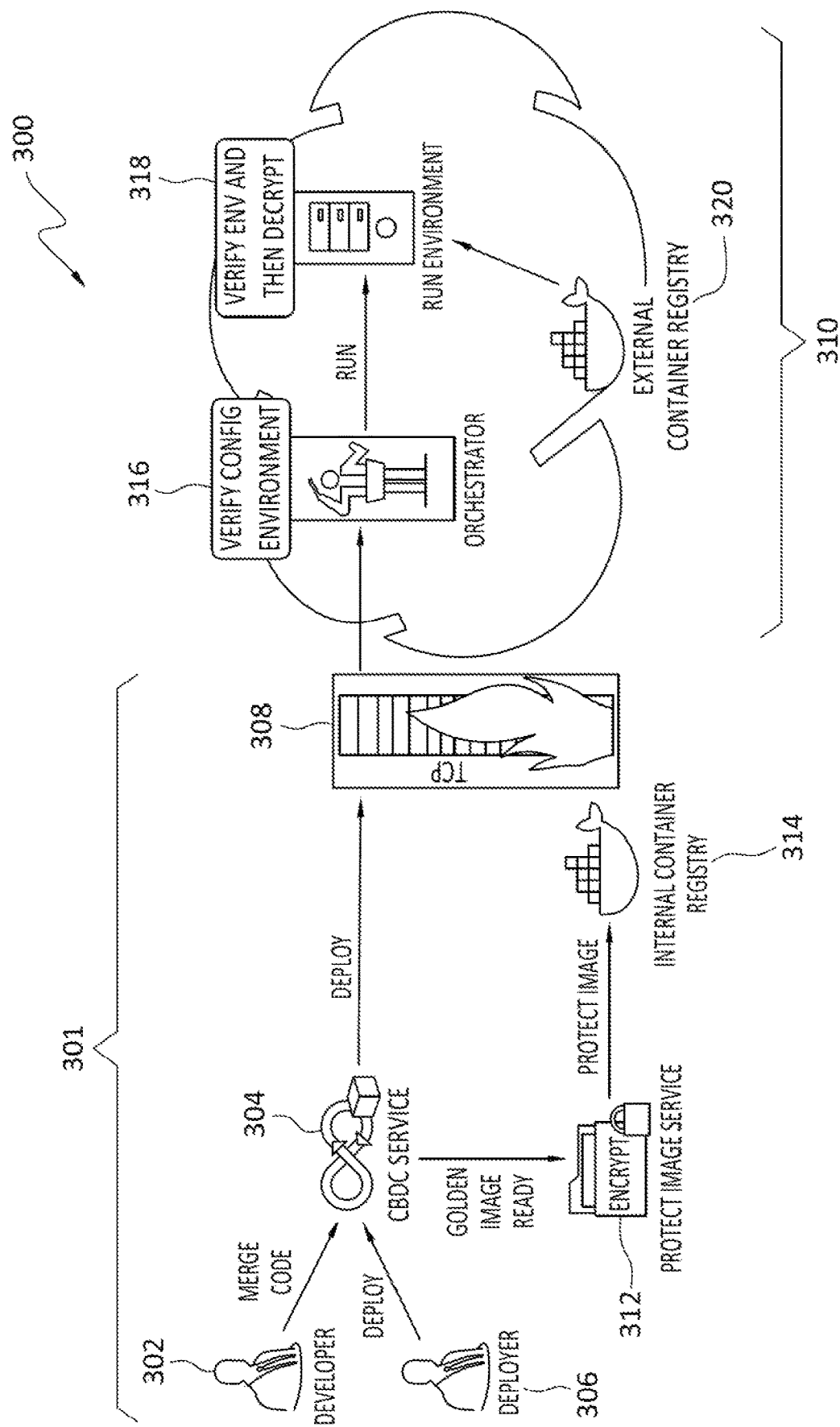
FIG. 3 discloses aspects of an example architecture.

In general, at least some example embodiments may be employed in connection with an architectural model that involves a development environment that produces encrypted docker images, and a Kubernetes production environment located in a remote destination over public network. Aspects of one example of such an architectural model are disclosed in FIG. 3.

As shown, the example architecture 300 includes an environment 301 that may be configured to enable one or more code developers 302 to merge their code together, possibly several times as code continues to be developed, and transmit, such as on an ongoing basis for example, the merged code to a CI/CD (Continuous Integration/Continuous Delivery) service 304. The code may be configured to be deployed by a deployer 306, such as AWS or Docker for example. In this example, the deployer 306 may be a human who has permissions and privileges to deploy the application. In other embodiments, the deployer may be a computing entity. The code may be deployed, using TCP isolation 308, to a production environment 310 which may comprise, for example, a Kubernetes environment. The environment 301 may comprise a development environment and/or a deployment environment.

At the same time, or a different time, or as an alternative to that code deployment, the CI/CD service 304 may use the merged code to generate a 'golden image.' In general, a golden image embraces, without limitation, a container image that is immutable once built. That is, the golden image is not changed after it is built. The golden image may be provided to a protect image service 312 which can encrypt the golden image and then provide the encrypted image to an internal, that is, internal to the development environment, container registry 314. In addition, or alternatively, the image may be cryptographically signed, and this signature used in the production environment to verify the authenticity of the image and to make sure it was not tampered with.

The code deployed by the CI/CD service 304 may be provided to an orchestrator 316 in the production environment 310. The orchestrator 316 may verify the configuration of the code, and that the code is suitable for use in the production environment 310. The orchestrator may use the digital signature to verify the image is indeed authentic and was not tampered with during the transfer to the production environment.

Upon successful evaluation by the orchestrator 316, the code may be run in a runtime environment 318. On the other hand, the encrypted golden image, or other encrypted image, may be registered in an external configuration registration 320 and then made available for execution in the runtime environment 318. In general, and as discussed in more detail below, the encrypted image may be decrypted, using a decryption key whose several parts, or subset of parts, may be obtained from various entities. The decrypted image may then be run in the runtime environment 318.

With the description of the example architecture 300 in view, further details are provided concerning some example embodiments of the invention which may comprise, among other things, the handling of decryption keys, on a per image basis, in a secure manner.

Such an approach may provide various useful functionalities such as, for example, the ability to deploy an image, such as a Docker image for example, to a Kubernetes production environment in a remote location, and the ability to pass, in a secure manner, the decryption key matching the Docker image. Another useful functionality that may be provided by some example embodiments is the implementation of a secure process that may verify that a deployed image is entitled to access to a decryption secret. In this way, imposters or other bad actors may be prevented from obtaining keys that they are not authorized to access or use.

From an image security perspective, some embodiments should meet the following requirements: have a secure manner to store the decryption key matching the image in a Kubernetes production environment; have a secure manner to pass a specific decryption key per image to and in a remote location; and, introduce elements that verify, such as at run time in a Kubernetes ecosystem, that a certain deployment of a container is entitled for a decryption key.

C. Secret Sharing

As noted earlier, image security may be achieved, in some embodiments, through the use of secret sharing. While the scope of the invention is not limited to any particular scheme for secret sharing, some example embodiments may employ Shamir's Secret Sharing (SSS) algorithm. In general, the SSS algorithm refers to an algorithm where a secret, such as a decryption key for example, is split into 'n' unique parts defined by the user, where 'n' may be any integer ≥3. The SSS algorithm may also define the minimum needed number 'k' of parts needed to restore the secret, and 'k' may be less or equal to the splitted 'n' amount, that is, k≤n. Thus, the SSS algorithm employs 3 parameters to split, and reconstruct, a secret, namely: the secret to be split; the number 'n' of unique parts into which the secret is to be split; and, the minimum number 'k' of the 'n' parts needed to reconstruct the secret. Advantageously then, the SSS algorithm may decentralize custody and control of secret information, such as decryption keys.

Figure 4:
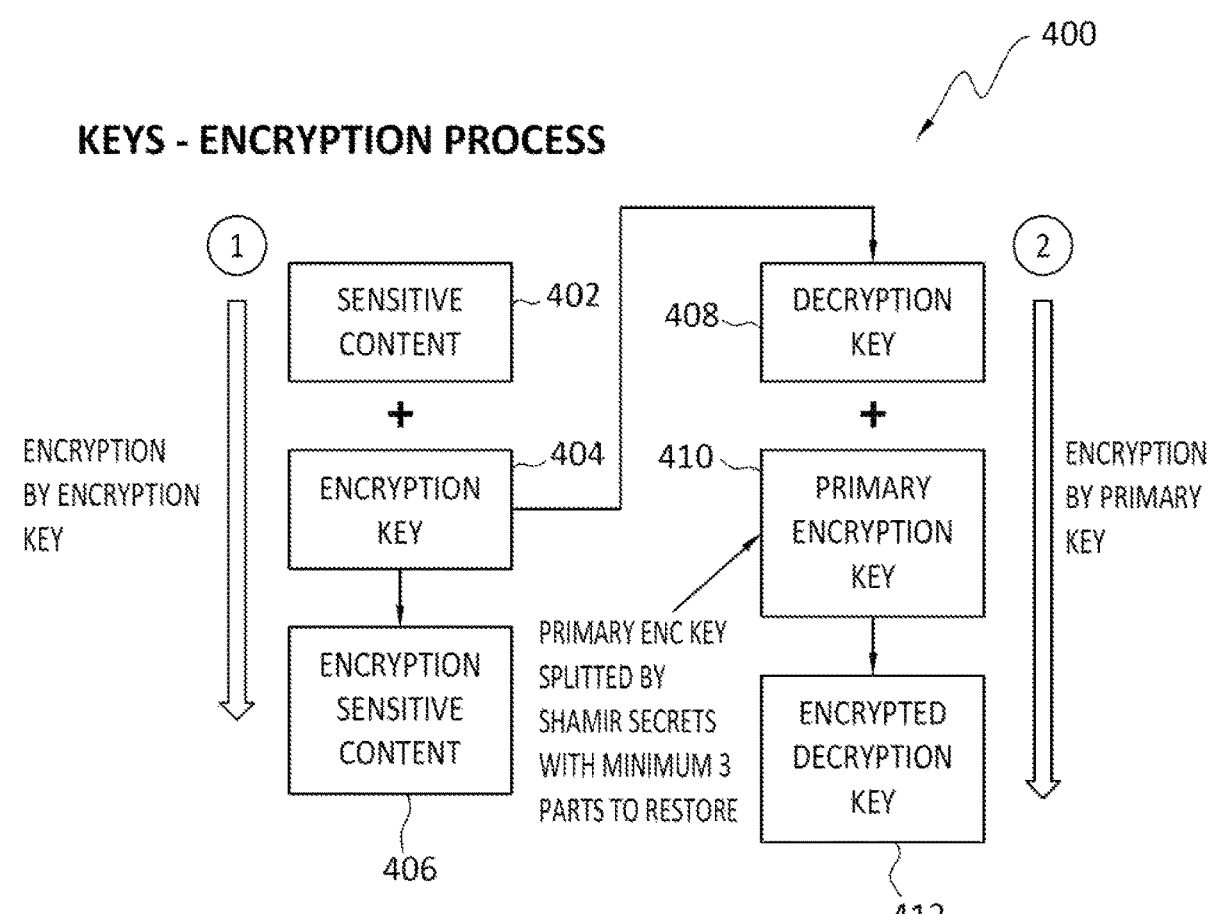
FIG. 4 discloses aspects of an example encryption process.

Turning now to FIG. 4, details are provided concerning a process 400 for using an algorithm, such as the SSS algorithm, for encryption of secret information, such as a decryption key, in such a way that the information need to decrypt the encrypted secret information is decentralized and each of the 'n' parts of the secret information may be in the custody of different respective entities. More specifically, the SSS algorithm may be used to split a secret needed in a production environment for enabling safer decryption of Docker images at run time.

A primary key may be defined as a secret that may be split by the SSS algorithm and used to encrypt other secrets. This primary key may, in some embodiments, be split with n=3 minimum parts required for restoration, where the parts are referred to here as K1, K2 and K3. This secret in this example, that is, the primary key, may be used to encrypt other decryption keys that are bound to specific encrypted docker images so those other decryption keys may be transmitted during the deployment in a secure manner, as discussed below in connection with FIG. 4.

In general, FIG. 4 discloses an example method 400 which uses a primary secret to encrypt the decryption key used to decrypt the encrypted sensitive data. In some embodiments, the encryption key may also serve as the decryption key if symmetric encryption is employed.

The example method 400 may begin when sensitive content 402 is encrypted using an encryption key 404. This encryption process results in encrypted sensitive content 406. The encryption key 404 may also serve as a decryption key 408 that is encrypted by a primary encryption key 410, resulting in an encrypted decryption key 412. As further indicated in FIG. 4, the primary encryption key 410 may be split, such as with the SSS algorithm for example, into multiple parts. In some embodiments, the primary encryption key 410 is split in such a way that a minimum of 3 parts (K1, K2, and K3) are needed to restore the primary encryption key 410, although other minimum numbers of parts may be used in other embodiments.

With continued reference to FIG. 4, some example embodiments may be implemented in a Kubernetes environment, although that is not necessarily required, and embodiments may be employed in other environments. In this example, parts K2 and K3 may be stored in the Kubernetes environment with designated, or standard, secret management methods. More particularly, a Deployment Verification Service (DVS), also referred to as orchestrator 316 in FIG. 3, may handle K2, while a Node Verification Service (NVS) may handle K3.

The NVS may verify that the target platform node is valid. For example, the DVS may ensure a correct image, that is, that a deployed image is authentic. The NVS may ensure a correct environment. There may be various ways to know if the environment is correct. For example, an image is allowed to run only on a specific environment node version, or not allowed to run on a specific region of AWS, or cannot run on a node that has other non-encrypted applications running on it, or with applications known to be malicious. These restrictions are stated in the image metadata and can be read and enforced by the NVS.

In this example, deployment pod metadata, that is, metadata of the pod that includes the container(s) that are desired to be deployed and run in the runtime environment, may contain: the decryption key 408 encrypted by the primary key 410; and, K1. Thus, in order to decrypt the sensitive information in the containers, and then run the container applications, the deployment entity needs three elements, namely, the secret, K2 (from the DVS), and K3 (from the NVS).

Upon a deployment request arriving at a deployment, or production, environment, such as Kubernetes for example, the DVS may validate that the deployment specified in the request is legitimate and, if so, may add K2 to the deployment meta data in the deployment pod. When running the decryption application, a request may be made by the deployment pod to the NVS, and the request passed to the NVS may include K1, K2, and the encrypted decryption key needed for the decryption of sensitive data of docker image. In response to the request, the NVS may then decide, based on various criteria, whether or not the deployment pod should be supplied with the decrypted decryption key. Splitting the key and having each service provide a part may ensure that the image has indeed gone through all the verifications needed in order and without skipping any of them. This ensures that imposter images will not gain access to the decryption key, as the full key is a product of the last stage of the process.

Figure 5:
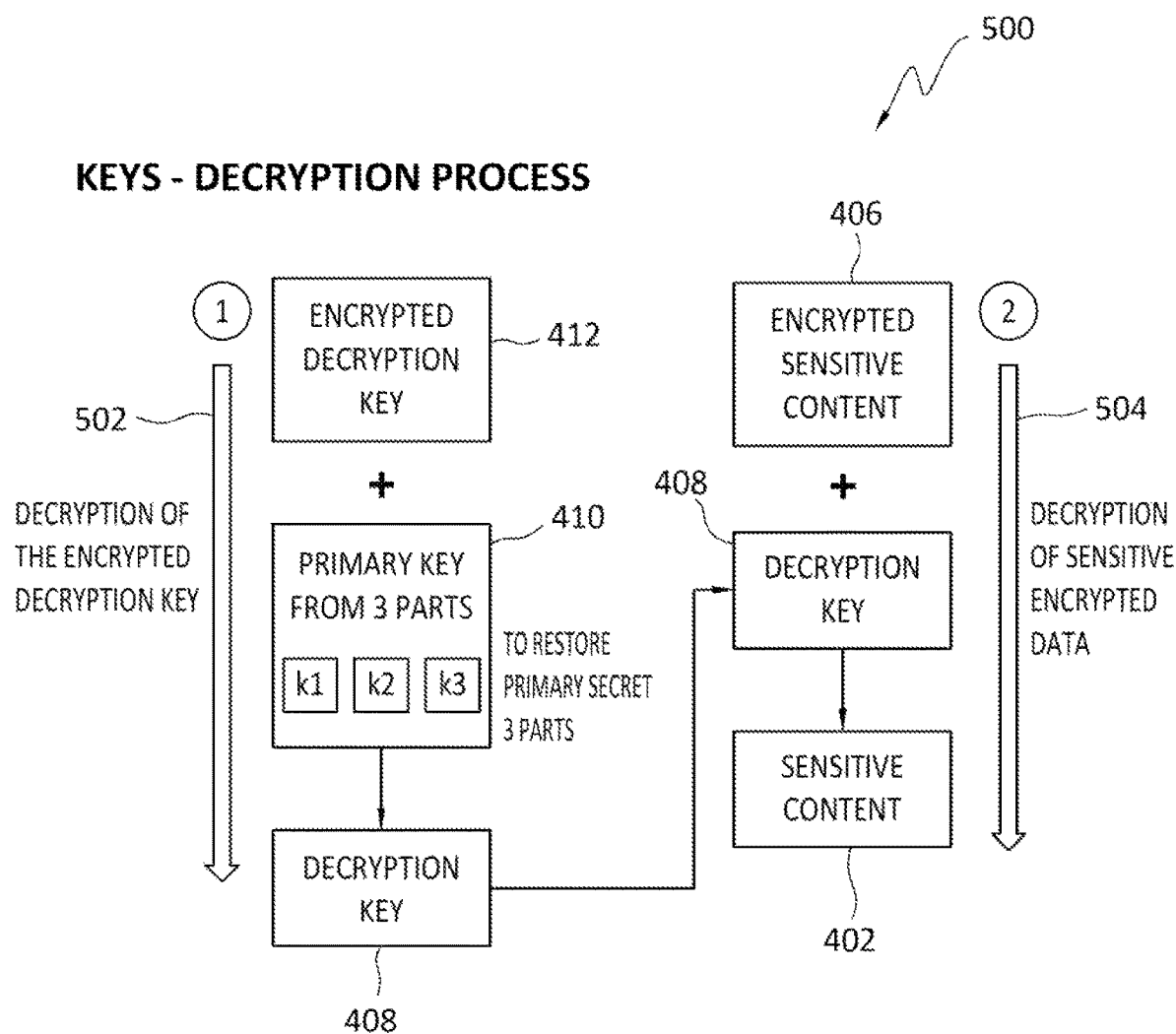
FIG. 5 discloses aspects of an example decryption process.

With reference now to the example process 500 in FIG. 5, and continued reference to FIG. 4, the NVS may use K1 and K2, provided in the request received from the deployment pod, along with K3 that is held by the NVS, to restore the secret, that is, the primary encryption key 410 (from which K1, K2, and K3, were generated), that is needed to decrypt the encrypted decryption key 408. For a more complete example: K1 for a specific image is transmitted directly to the production site upon image deployment, K2 is given after the DVS verifies the image is authentic, K3 after the image is cleared to run on the target platform. In more detail, the encrypted decryption key 412 may be decrypted 502 using parts K1, K2, and K3, so that access is thereby gained to the decryption key 408. The decryption key 408 may then be used to decrypt 504 the encrypted sensitive content 406, thus enabling access to the sensitive content 402.

Note that the foregoing are only example stages, and are not intended to limit the scope of the invention. For example, the key may be split into more parts and may undergo any set of verifications, examples of which include version matches, and compatibility with other environment elements. A user, for example, may determine which particular verifications are important enough, and therefore should be guaranteed by enforcing the split key part.

Figure 6:
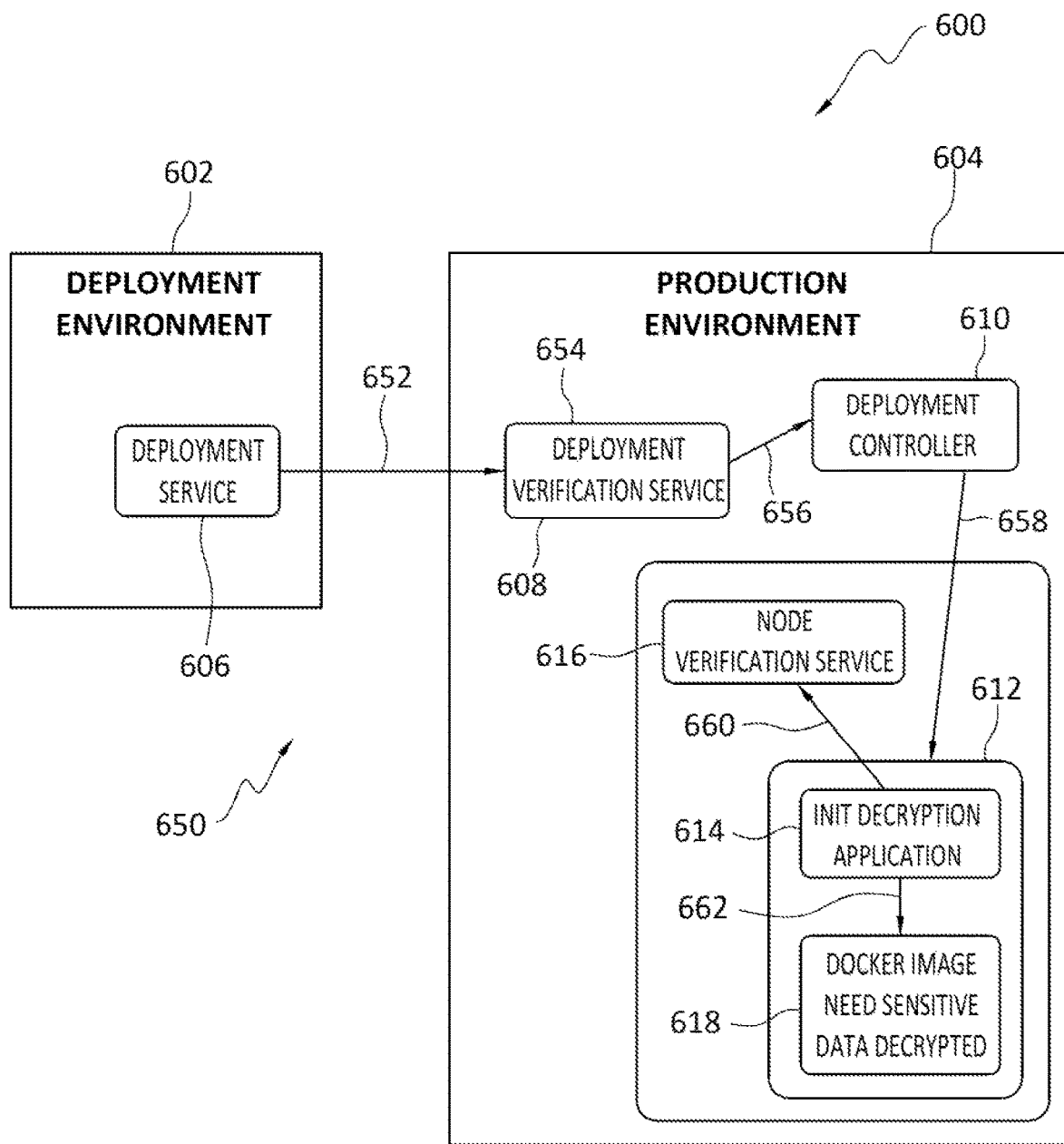
FIG. 6 discloses aspects of an example architecture and associated processes.

In more detail, and with reference now to FIG. 6 which discloses an architecture 600 that includes a deployment environment 602 and a production environment 604, such as a Kubernetes environment for example, further details are provided concerning example processes such as were discussed above in connection with the example of FIG. 5.

As indicated in FIG. 6, a deployment service 606 may be running in the deployment environment 602, and the deployment service 606 may communicate with a deployment verification service (DVS) 608 running in the production environment 604. The DVS 608 may communicate with a deployment controller 610, such as a Kubernetes deployment controller for example, and the deployment controller 610 may operate to provision and deploy a deployment pod, or simply 'pod,' 612. In the example of FIG. 6, the pod 612 includes an 'Init' container 614 that may communicate with a node verification service (NVS) 616, and an application container 618, such as a 'Clean' container for example. As well, the 'Init' container 614 may communicate with the application container 618. Note that the 'Init' container is not mandatory. It may be used in the "split Docker" option mentioned in the beginning of the dock. The 'Init' container, if exists, guaranteed to be run by Kubernetes before the main application container, and can be used for in initialization and enforcement of conditions, and a failed Init fails the runs.

An example process 650 may begin when a deployment manifest, which may include K1 and deployment details, is passed 652 from the deployment service 606 to the DVS 608. The DVS 608 may then verify 654 the deployment details, and any changes to those details, specified in the deployment manifest and, upon successful verification, may add K2 to the deployment manifest and pass 656 the updated deployment manifest, which now includes both K1 and K2, to the deployment controller 610.

As shown in FIG. 6, the deployment controller 610 is deploying 658 the deployment pod 612. The decryption application 614, which may possess the decryption secret, may then request 660 a decryption operation for the encrypted key by providing, to the NVS 616, K1, K2, and the decryption secret. The NVS 616 may perform a further verification process, for example, by confirming the validity of K1, K2, and the decryption secret, and if those elements are known by the NVS 616 to correspond to K3, held by the NVS 616, then the NVS 616 may decrypt the encrypted decryption key and return the decryption key to the decryption application 614. Finally, the decryption application 614 may use the decryption key to decrypt the encrypted sensitive content and pass 662 the sensitive content to the application container 618 for use by the application.

It is noted with respect to the example methods and processes of FIGS. 4, 5, and 6, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Following is some additional discussion of some aspects of example embodiments

D. Further Discussion

With continued reference to example implementations of a primary encryption/decryption key, that key may take the form of a long-lived symmetric encryption key, also known as a primary key/secret. This key may reside in the development environment and may be different in its type and associated policy from a Docker images encryption key. As noted herein, the primary key may be split by the SSS algorithm. Some embodiments of the algorithm may take the form 'ShamirSplit (PrimaryKey, 3, 3),' which means that the primary key will be split in no fewer than 3 parts, and a minimum of 3 parts are needed to obtain the primary key. Of course, a different number of stages may be implemented and the primary key split in accordance to the number to stages. While example embodiments refer to 3 stages, the SSS algorithm may be employed for other stage counts greater, or less, than 3.

The original decryption key of a Docket image may be encrypted with the primary encryption key. That is, the primary encryption key that is constructed using the SSS algorithm may be used to encrypt the decryption key of any Docker image that includes sensitive data that requires decryption in a production environment.

Various parts of the primary key may be stored in the production environment, although the splitting may lose some efficacy in such an arrangement and, as such, in other embodiments, not all the primary key parts are stored in the production environment. For example, after the creation of the primary encryption key and splitting of that key with the SSS algorithm with minimum 3 needed parts to restore the key, two parts of the key may be stored in the production environment in any conventional, secure, manner. The production environment may be a Kubernetes environment, but that is not required. As discussed in connection with the example configuration disclosed in FIG. 6, each part of the primary key may be stored and handled by a different respective service with a specific. In at least some embodiments, the 2 key parts may be transferred to the production environment entities only once, that is, the transfer may be a one-time transfer.

As noted earlier, the DVS (Deployment Verification Service) may be responsible to handle the K2 part of the primary secret, in the example case where parts K1, K2, and K3, are created. The DVS may be assigned with a web-hook, or other mechanism, to a deployment controller so that all deployments by the DVS may be passed through the deployment controller, and the deployment requests can be changed if needed. Upon a legitimate deployment of a service requiring decryption, the DVS may add K2 to deployment metadata. DVS may check the deployment pod and metadata hashes, permissions, and possibly a cryptographic approval chain. The DVS may check that the deployment pod was not tampered with and abides by any restrictions stated in the pod metadata. The implementation of this check may range from signature and hash checks to more sophisticated operations. Approval of the deployment pod by the DVS may indicate that the deployment package is legitimate and is allowed to run on the requested, or specified, platform. Note that if the DVS is not run, the webhook not triggered, or for any other reason, the K2 part is not added to the manifest and the next stage will fail, or the decryption will fail due to the missing key part.

The NVS may be responsible for the K3 part of the primary secret. The NVS may be deployed, for example, as daemon-set in Kubernetes, and may responsible for verifying the deployment pod that requests the NVS services on a specific node, for example, to verify the caller, that is, the deployment pod making the request. For example, the NVS may be requested by the deployment pod to restore the primary secret at run time, and the deployment pod may provide, as elements of that request, K1, K2 and the decryption key that is encrypted by the primary key. After validating the deployment pod that requested this service, the NVS may use the provided K1 and K2, along with the K3 held by the NVS, to restore the primary key and use the primary key to decrypt the provided encrypted decryption key. The NVS may respond to the deployment pod request by transmitting the decryption key to the requesting deployment pod. To verify that the requesting deployment pod is legitimate, methods similar to those employed by the DVS can be employed. One difference here is that the DVS may be a sealed deployment package before it is run, while the NVS is validating a running 'Init' decryption pod and there is a need to ensure that no problems or changes took place between application deployment and runtime. It is noted as well that deployment occurs once and the same deployed image may be run multiple times, but verification of the deployment pod may need to be performed each time the image is to be run.

At least some embodiments provide for protection of the decryption key while the decryption key is in transit from the deployment environment to the production environment. As noted earlier herein, the encrypted Docker package may contain only the encrypted decryption key and K1 in the manifest, and these items may be sent via network to the production environment. Even if all these elements should fall into the hands of an untrusted party during transit, those elements would be useless because the Docker image is encrypted, the decryption key is encrypted, and the attached part of the primary key K1 is useless on its own without K2 and K3, which are well protected in the production environment.

Restoration of the primary key may be performed by the NVS after the requesting deployment pod has been verified, and has presented to the NVS K1, K2 and the value that need to be decrypted by the primary key. After restoration of the primary key by the NVS, the decryption key may be decrypted and returned to the deployment pod for use in decrypting the sensitive content needed to run the container. It is noted that the container decryption key is not, and should not, be stored anywhere, since to store that key may violate the secret key partition. In one alternative approach, the NVS may handle parts of the decryption process and not expose the decryption key at all.

As will be apparent from this disclosure, example embodiments embrace approaches for handling a needed decryption keys for sensitive Docker images, and passing the decryption keys in a secure manner upon deployment to a remote production location. As well, embodiments may employ a primary symmetric encryption key that may be used to encrypt the decryption keys and decrypt the decryption keys in a production environment. Further, security of the primary key may be attained by splitting the primary key into 3 parts, for example, and storing 2 of those parts in different locations in a production environment, for example. More generally, the primary key may be split into other numbers of parts, and the parts stored in different respective locations. It is not required that any part be stored in any particular location. Some embodiments provide for verification of an application that requests restoration of the primary key for decryption usage in connection with an application in deployment pod. Finally, embodiments of the invention may prevent bypassing of any of the verification steps taken in order to validate the request for the decryption key.

E. Further Example Embodiments

Following are some further example embodiments of the invention. These are presented only by way of example and are not intended to limit the scope of the invention in any way.

Embodiment 1. A method, comprising: using a primary key to encrypt a decryption key; splitting the primary key into 'n' parts, where at least 'k' parts of the 'n' parts are required in order to restore the primary key, and 'k'≤'n'; storing some of the 'k' parts in different respective locations in a production environment, and one of the 'k' parts that is stored is held by a node verification service; receiving, at the node verification service, a request for restoration of the primary key, where the request is received from a deployment pod and the request includes a subset of the 'k' parts and the encrypted decryption key; performing, by the node verification service, a validation process concerning the deployment pod; upon successful validation of the deployment pod, restoring, by the node verification service, the primary key, wherein the primary key is restored using the 'k' part held by the node verification service, and using the subset of the 'k' parts received from the deployment pod; and using, by the node verification service, the restored primary key to decrypt the encrypted decryption key received from the deployment pod.

Embodiment 2. The method as recited in embodiment 1, further comprising transmitting, by the node verification service, the decrypted decryption key to the deployment pod.

Embodiment 3. The method as recited in embodiment 2, further comprising using, by the deployment pod, the decryption key received from the node verification service to decrypt sensitive content needed to run a container that is included in the deployment pod.

Embodiment 4. The method as recited in any of embodiments 1-3, further comprising verifying information in a deployment manifest associated with the deployment pod and, upon successful verifying, adding one of the parts of the subset of 'k' parts to the deployment manifest, and transmitting the deployment manifest to a deployment controller.

Embodiment 5. The method as recited in any of embodiments 1-4, further comprising encrypting sensitive content of a container using an encryption key, and the encryption key serves as the decryption key that is encrypted using the primary key.

Embodiment 6. The method as recited in any of embodiments 1-5, wherein the primary key is not restored by the node verification service unless the deployment pod is validated.

Embodiment 7. The method as recited in any of embodiments 1-6, wherein the method is performed in a production environment, and one of the parts in the subset of 'k' parts is provided at least indirectly to the deployment pod by an entity outside of the production environment.

Embodiment 8. The method as recited in any of embodiments 1-7, wherein one of the parts in the subset of 'k' parts is provided at least indirectly to the deployment pod by a deployment verification service.

Embodiment 9. The method as recited in any of embodiments 1-8, wherein the decryption key received by the deployment pod is not stored anywhere.

Embodiment 10. The method as recited in any of embodiments 1-9, wherein the parts of the primary key are never all transmitted together.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
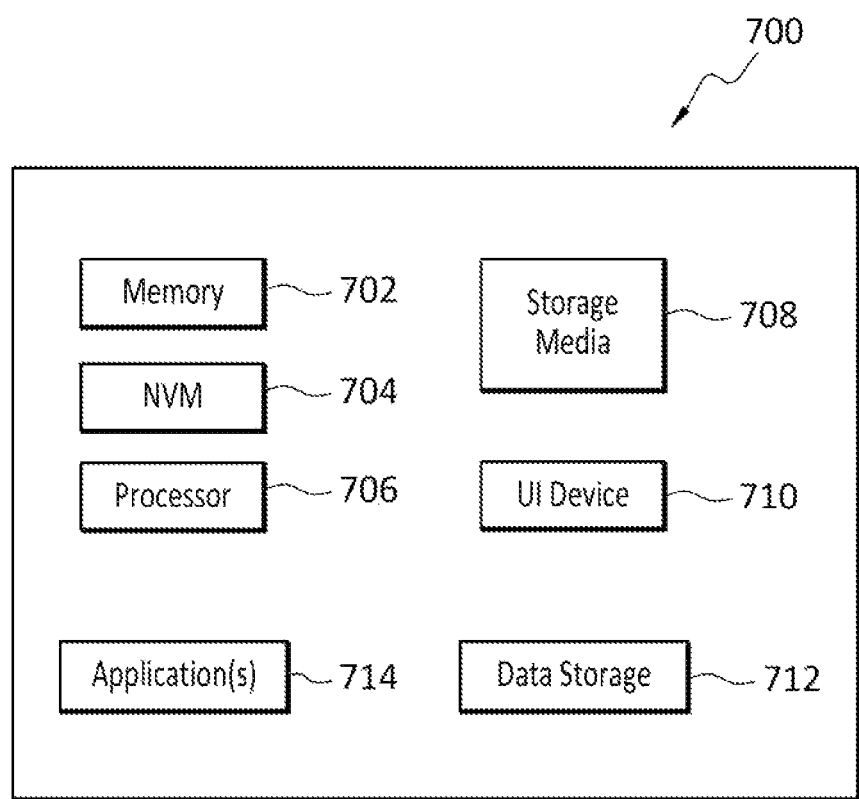
FIG. 7 discloses aspects of an example computing entity configured to perform any of the disclosed methods and processes.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   using a primary key to encrypt a decryption key;
   splitting the primary key into 'n' parts, where at least 'k' parts of the 'n' parts are required in order to restore the primary key, and 'k'='n';
   storing some of the 'k' parts in different respective locations in a production environment, and one of the 'k' parts that is stored is held by a verifier stage;
   receiving, at the verifier stage, a request for restoration of the primary key, where the request is received from a deployment pod and the request includes a subset of the 'k' parts and the encrypted decryption key;
   performing, by the verifier stage, a validation process concerning the deployment pod;
   upon successful validation of the deployment pod, restoring, by the verifier stage, the primary key, wherein the primary key is restored using the 'k' part held by the verifier stage, and using the subset of the 'k' parts received from the deployment pod; and
   using, by the verifier stage, the restored primary key to decrypt the encrypted decryption key received from the deployment pod.

2. The method as recited in claim 1, further comprising transmitting, by the verifier stage, the decrypted decryption key to the deployment pod.

3. The method as recited in claim 2, further comprising using, by the deployment pod, the decryption key received from the verifier stage to decrypt sensitive content needed to run a container that is included in the deployment pod.

4. The method as recited in claim 1, further comprising verifying information in a deployment manifest associated with the deployment pod and, upon successful verifying, adding one of the parts of the subset of 'k' parts to the deployment manifest, and transmitting the deployment manifest to a deployment controller.

5. The method as recited in claim 1, further comprising encrypting sensitive content of a container using an encryption key, and the encryption key serves as the decryption key that is encrypted using the primary key.

6. The method as recited in claim 1, wherein the primary key is not restored by the verifier stage unless the deployment pod is validated.

7. The method as recited in claim 1, wherein the method is performed in a production environment, and one of the parts in the subset of 'k' parts is provided at least indirectly to the deployment pod by an entity outside of the production environment.

8. The method as recited in claim 1, wherein one of the parts in the subset of 'k' parts is provided at least indirectly to the deployment pod by a deployment verification service.

9. The method as recited in claim 1, wherein the decryption key received by the deployment pod is not stored anywhere.

10. The method as recited in claim 1, wherein the parts of the primary key are never all transmitted together.

11. A computer readable storage medium having stored therein instructions that are executable by one or more hardware processors to perform operations comprising:
    using a primary key to encrypt a decryption key;
    splitting the primary key into 'n' parts, where at least 'k' parts of the 'n' parts are required in order to restore the primary key, and 'k'='n';
    storing some of the 'k' parts in different respective locations in a production environment, and one of the 'k' parts that is stored is held by a verifier stage;
    receiving, at the verifier stage, a request for restoration of the primary key, where the request is received from a deployment pod and the request includes a subset of the 'k' parts and the encrypted decryption key;
    performing, by the verifier stage, a validation process concerning the deployment pod;
    upon successful validation of the deployment pod, restoring, by the verifier stage, the primary key, wherein the primary key is restored using the 'k' part held by the verifier stage, and using the subset of the 'k' parts received from the deployment pod; and
    using, by the verifier stage, the restored primary key to decrypt the encrypted decryption key received from the deployment pod.

12. The computer readable storage medium as recited in claim 11, wherein the operations further comprise transmitting, by the verifier stage, the decrypted decryption key to the deployment pod.

13. The computer readable storage medium as recited in claim 12, wherein the operations further comprise using, by the deployment pod, the decryption key received from the verifier stage to decrypt sensitive content needed to run a container that is included in the deployment pod.

14. The computer readable storage medium as recited in claim 11, wherein the operations further comprise verifying information in a deployment manifest associated with the deployment pod and, upon successful verifying, adding one of the parts of the subset of 'k' parts to the deployment manifest, and transmitting the deployment manifest to a deployment controller.

15. The computer readable storage medium as recited in claim 11, wherein the operations further comprise encrypting sensitive content of a container using an encryption key, and the encryption key serves as the decryption key that is encrypted using the primary key.

16. The computer readable storage medium as recited in claim 11, wherein the primary key is not restored by the verifier stage unless the deployment pod is validated.

17. The computer readable storage medium as recited in claim 11, wherein the computer readable storage medium is performed in a production environment, and one of the parts in the subset of 'k' parts is provided at least indirectly to the deployment pod by an entity outside of the production environment.

18. The computer readable storage medium as recited in claim 11, wherein one of the parts in the subset of 'k' parts is provided at least indirectly to the deployment pod by a deployment verification service.

19. The computer readable storage medium as recited in claim 11, wherein the decryption key received by the deployment pod is not stored anywhere.

20. The computer readable storage medium as recited in claim 11, wherein the parts of the primary key are never all transmitted together.

* * * * *